Nov. 26, 1968  J. A. DE GREEF  3,412,857
DEVICE AND METHOD FOR SORTING IN SIZE AGRICULTURAL OR
HORTICULTURAL PRODUCTS
Filed Nov. 8, 1966  3 Sheets-Sheet 1
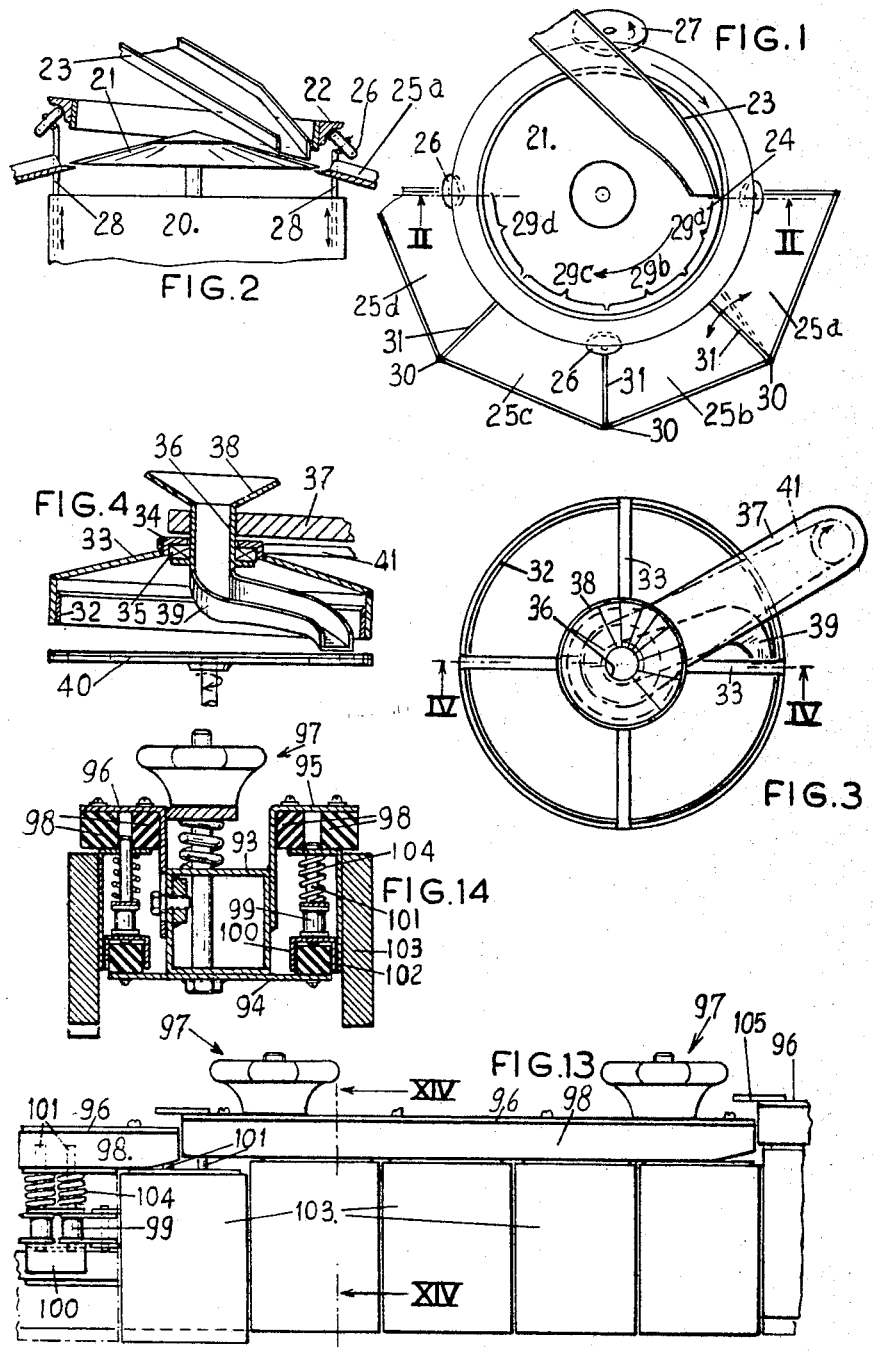
INVENTOR
JAN A. de GREEF
BY
ATTORNEYS Nov. 26, 1968  J. A. DE GREEF  3,412,857
DEVICE AND METHOD FOR SORTING IN SIZE AGRICULTURAL OR
HORTICULTURAL PRODUCTS
Filed Nov. 8, 1966  3 Sheets-Sheet 2

INVENTOR
JAN A. de GREEF
BY
ATTORNEYS

Nov. 26, 1968            J. A. DE GREEF            3,412,857
DEVICE AND METHOD FOR SORTING IN SIZE AGRICULTURAL OR
HORTICULTURAL PRODUCTS
Filed Nov. 8, 1966            3 Sheets-Sheet 3
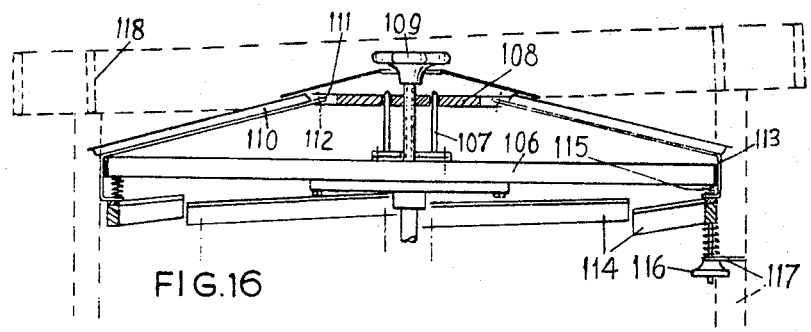
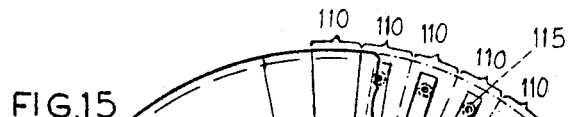
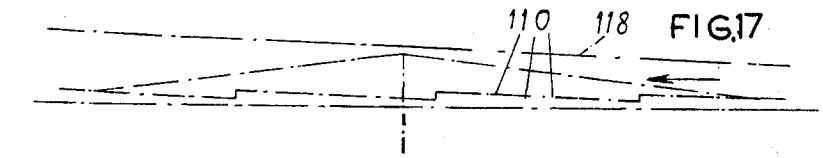
INVENTOR
JAN A. de GREEF
BY
ATTORNEYS United States Patent Office 3,412,857
Patented Nov. 26, 1968

3,412,857
DEVICE AND METHOD FOR SORTING IN SIZE AGRICULTURAL OR HORTICULTURAL PRODUCTS
Jan A. de Greef, De Hoekenburg 2,
Tricht, Netherlands
Filed Nov. 8, 1966, Ser. No. 592,816
Claims priority, application Netherlands, Dec. 20, 1965,
6516611
10 Claims. (Cl. 209—105)

ABSTRACT OF THE DISCLOSURE

The method and apparatus for sorting rollable articles wherein the articles are passed along a chute defined by a driven conveying member and a driven measuring bar. The conveyor and bar are driven in the same direction, but the bar is driven at a slower speed than that of the conveyor.

---

The invention relates to a device for sorting in size agricultural or horticultural fruits, comprising a frame, a driven conveying member mounted for rotation in said frame about an axis directed downwards and further comprising a measuring bar supported by said frame, wherein said measuring bar extends above at least part of the periphery of the conveying member and is adapted to be adjusted with respect to said periphery so that it is spaced from the conveying member at a height increasing in the direction of rotation of the conveying member from a supply place for supplying fruits to the conveying member along and beyond a plurality of delivery places for delivering fruits from the conveying member, said conveying member and said measuring bar forming together an uninterrupted chute for the fruits.

With known devices of the above mentioned kind, which have a stationary measuring bar, the chance of damage of the fruits is rather great as the fruits rub this stationary measuring bar during the sorting operation. These known devices, therefore, are not usable for sorting non-rolling fruits, e.g. pears, cucumbers and carrots.

It is one object of the invention to considerably reduce the chance of damage of the fruits during sorting.

Another object of the invention is to provide a device for sorting fruits, having a great capacity.

A main object of the invention is to provide a rotating device for sorting fruits, of which the measuring bar is driven, without any spoke of this measuring bar intersecting the path of the fruits before, during or after sorting.

Another important object of the invention is to increase the exactness of sorting and to develop a new device to that aim, in which a space between the conveyor member and the measuring bar increases in steps.

A further object of the invention is to provide new methods of sorting non-rolling fruits, e.g. pears, cucumbers and carrots, and new methods of sorting rolling fruits, e.g. apples and tomatoes, the latter method giving considerably improved rates of sorting, all with the aid of said new device.

Other features of the present invention will be readily apparent from the following description of several embodiments of a sorting device according to the invention made with reference to the accompanying drawings. In said drawings:

FIG. 1 is a top view of a sorting device according to the invention;

FIG. 2 is a cross section along the line II—II of FIG. 1;

FIG. 3 is a top view of a variant of the device of FIG. 1, in which the boxes for receiving fruits are not shown;

FIG. 4 is a cross section along the line IV—IV of FIG. 3;

FIG. 13 is a flattened side view of a particular measuring bar for a device according to the invention;

FIG. 14 is a cross section along the line XIV—XIV of FIG. 13;

FIG. 15 is a view corresponding with FIG. 3 of still another sorting device according to the invention;

FIG. 16 is a cross section along the line XVI—XVI of FIG. 15; and

FIG. 17 is a more schematic side view of the sorting space of the device of FIGS. 15 and 16.

Figure 12:
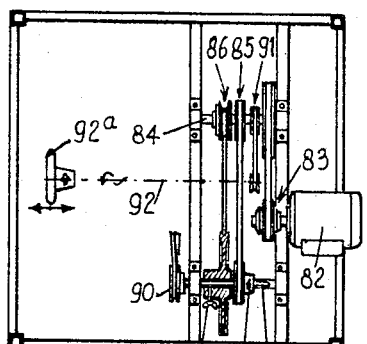
FIG. 12 is a top view of a gearing particularly suitable for each of the sorting devices according to the invention.

The sorting device of FIGS. 1 and 2 mainly consists of a frame 20, a driven conveying member formed by a cone 21 mounted for rotation in this frame about a vertical axis, a measuring bar formed by a ring 22 mounted for rotation at an adjustable height above the cone, a supply shoot 23 from which the fruits to be sorted are supplied one by one at the supply place 24 onto the upper surface of the cone 21 and a plurality of boxes 25a, 25b, 25c and 25d each disposed at the periphery of the cone. The ring 22 bears on three freely rotatable rollers 26 and a driven roller 27. The rollers 26 and 27 forming the guide members of the measuring bar are mounted adjustbaly in height by means of sliding members 28. In order to obtain that each of the fruits, depending on its size, can land in only one of the boxes 25a, 25b, 25c or 25d through the spade between cone 21 and ring 22 at the respective one of delivery places 29a, 29b, 29c or 29d, the height of the sliding members 28 and thus the height of the ring 22 above the cone 21 is adjusted so that this height at the delivery place 29a is smallest and increases from this delivery place 29a beyond the delivery place 29d. The walls 31 between the boxes 25a, 25b, 25c and 25d are swingable about a vertical axis 30 for adjusting the widths of the delivery places for friuts of a given size.

It should be noted, that no spokes are provided between the conveying member and the measuring bar, which spokes would disturb the measuring exactness. During the supply and the delivery the friuts do not intersect any spoke, which would damage them, owing to the bearing of the ring 22 at its periphery.

In the sorting device of FIGS. 3 and 4 intersecting of the path of the fruits before, during or after sorting is prevented in another way. In this device the measuring bar is formed by a wheel having a measuring ring 32, spokes 33 and a hub 34. The hub 34 bears by means ot a ball bearing 35 on an hollow shaft 36. This hollow shaft is fixedly connected to the frame 37 of the sorting device and supports, at its upper end, a hopper 38 for receiving fruits and, at its lower end, a shoot 39 for supplying fruits to the conveying member formed by a disc 40. In this case the fruits are mainly driven through the space between measuring ring 32 and disc 40 by means of centrifugal force. Said wheel is driven by means of a driving belt 41.

Figure 5:
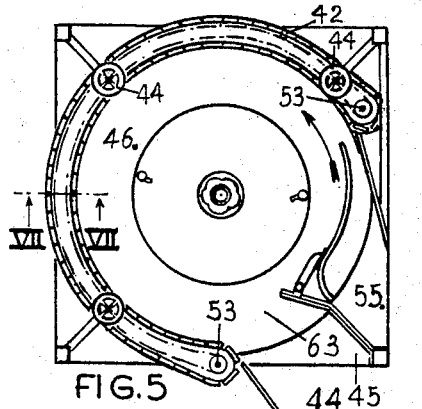
FIG. 5 is a view corresponding with FIG. 3 showing a further developed sorting device according to the invention.
Figure 7:
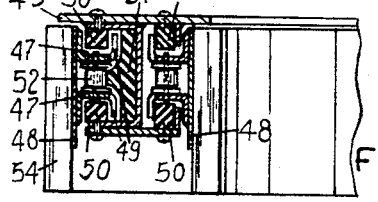
FIG. 7 is a cross section along the line VII—VII of FIG. 5.
Figure 6:
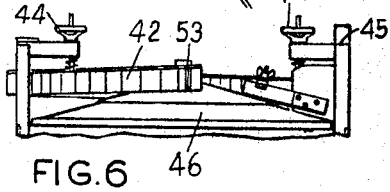
FIG. 6 is a part of a side view of the device of FIG. 5.

In the sorting device of FIGURES 5–7 the measuring bar is not formed by a measuring ring but by an endless measuring band 42 guided on both sides of a C-formed beam 43 having an I-formed cross section. The beam 43 is connected adjustably in height to the frame 45 by means of screws 44. With the aid of these screws 44 the height of the measuring band 42 above the conveying member formed by a cone 46 is adjustable. The measuring band 42 consists of a Galls chain 51, each second outer link 47 of which is connected over its whole length at a rectangular metal plate 48, and, at its middle part, supports a hook 49. The beam 43 supports at the inner side of each flange two nylon leading strips 50 and further on its body a nylon rail 51. Between the beam ends provided with chain wheels the chain 52 is guided and supported by means of the strips 50 and rail 51. All of the metal plates 48 are equally high and close up against each other at their edges so that an uninterrupted measuring bar is obtained. Preferably the plates 48 are coated at their outsides with layers of foam rubber 54 extending beyond the under edges of these plates.

This sorting device is, just like each of the above mentioned devices, provided with a supply shoot 55 and boxes, not shown.

Figure 8:
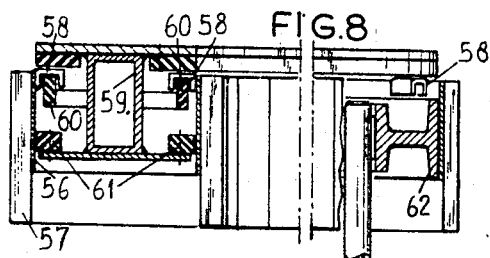
FIG. 8 is a cross section corresponding with FIG. 7 showing another sorting device according to the invention.

Instead of a chain with links the measuring bar of FIG. 8 may consist of an uninterrupted metal band 56 coated at the outside with a layer of foam rubber 57 and supporting at the upper edge inwardly directed hooks 58. The beam 59 adjusted in height with respect to the conveying member, not shown, supports two nylon guide strips 60 engaged by hooks 58 and two guide strips 61 holding the metal band 56. The beam 59 supports a reversal pulley 62 at each of its ends at least one of said pulleys being driven.

The sorting device having a driven measuring bar formed by a band or chain has the advantage that a greater part of the periphery can be operable than in sorting devices having a measuring ring of which only 180° is usable for sorting.

Preferably, above a part of the periphery of the conveying member, viz. at the delivery place 63 (FIG. 5) for overmeasured fruits, there is not provided a measuring bar in order to ensure that particularly large fruits leave the conveying member at this place.

Nearly the whole periphery of the conveying member is usable, e.g. for sorting fruits into a great number of classes having different sizes.

Figure 9:
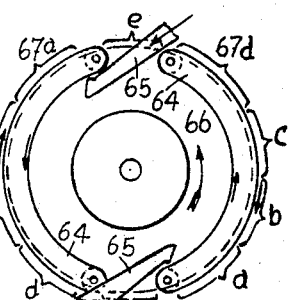

Contrarily, it is also possible, as shown in FIG. 9, to apply two driven measuring bars 64 formed by endless bands and two supply shoots 65 in combination with one and the same conveying member 66. In this case two groups of fruits are sorted in parallel, the smallest fruits being delivered at the two delivery places 67a and the overmeasured fruits at the two delivery places 67e, respectively. Depending on their sizes, the other fruits leave the conveying member at one of the delivery places 67b, 67c, 67d lying between the delivery places 67a and 67e.

Figures 10, 11:
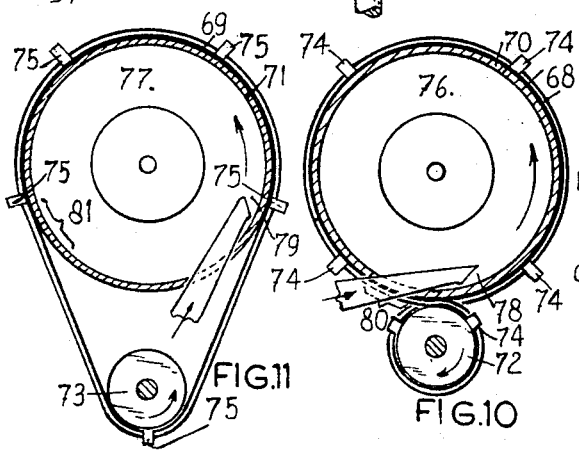
FIGS. 9, 10 and 11 are more schematic views corresponding with FIG. 3, each showing another embodiment of the sorting device according to the invention.

The measuring bands 68 and 69 of the sorting device of FIGS. 10 and 11 do not go and return at the same part of the periphery of the conveying member but run steadily in the same direction. The measuring bands each consist of an endless steel band, of which the upper edge engages a ring 70 respectively 71, mounted for rotation and a drive pulley 72 respectively 73. Guide members 74 respectively 75 are disposed so that they are divided over the path of each measuring band, said guide members being adjustable in height for adjusting the height of the measuring band above the conveying member 76 respectively 77, so that this height is smallest at the orifice of the supply shoot 78 respectively 79, and greatest at the delivery places 80 respectively 81 for the overmeasured fruits. The rings 70 and 71 e.g. can be mounted for rotation in the same way as the ring 22, provided the lower edges of the rings 70 and 71 extend above the lower edges of the measuring bands 68 respectively 69.

The sorting operation with each of the above described devices is carried out as follows:

During sorting pears and oblong or other non-rolling fruits, the measuring bar and the conveying member are driven with equal peripheral speeds in the same direction. Depending on the required capacity the peripheral speed is for instance 35–100 m./minute.

During sorting apples or other rolling fruits the measuring bar and the conveying member are again driven in the same direction; viz the conveying member with a peripheral speed of 35–100 m./minute and the measuring bar with a peripheral speed of 5.5–15 m./minute. Preferably, the peripheral speed of the conveying member is equal to 6 and a half times the speed of the measuring bar. In this method according to the invention the capacity of the sorting device is great. Furthermore the fruits automatically roll about their axes extending through crown and stem, which results in the fruits being measured over their diameters. The diameter determines the size of the fruit, particularly when fruits of a same type are sorted, which is nearly always the case.

It is remarked that the above mentioned ratio of conveying member speed to measuring bar speed is chosen at a little higher value for sorting more disc like fruits and at a little lower value for sorting more cylinder like fruits, e.g. five and eight respectively.

Each of the above mentioned sorting devices is suitable for carrying out both methods according to the invention, e.g. if they are provided with a drive gearing shown in FIG. 12.

A motor 82 drives, through a rope drive 83, a shaft 84 driving in turn a shaft 87 either through gearing 85 or through gearing 86. By tightening one of the wing nuts 88 respectively 89 either the gearing 85 or the gearing 86 is coupled to the shaft 87. This shaft is connected through the pulley 90 and through other drive means not shown to the above mentioned element 27, 41, 53, 62, 72 or 73. The shaft 84 also drives through a gearing 91 a shaft 92 having a key way, on which latter shaft 92 a drive pulley 92a coupled thereto by means of a key is slidable in axial direction. This drive pulley 92a, however, can be locked at a determined place against axial movement. This pulley yieldingly acts against the underside of the conveying member and thus drives this member with a speed which is accurately adjustable by the exact choice of the drive radius of the conveying member. In order to sort pears or oblong fruits and in order to sort rolling fruits the gearing 85 respectively the gearing 86 is coupled to the shaft 87. In the most preferred embodiment of the sorting device according to the invention the fruits to be sorted are conveyed, instead of along a continuous increasing space, along a stepwise increasing space. The guiding of the measuring bar of the device of FIGS. 13 and 14 is composed of the following stationary parts:

A hollow beam 93 fixed at the frame, a plate 94 connected to the beam 93 and protruding at both sides thereof, an uninterrupted angle steel 95 joined to the upper side of the beam 93, a number of T-steels 96 connected to the beam at an adjustable height, a number of jacks 97 for adjusting the height of the T-steels 96, two sets of guide strips 98 suspended from the underside of the horizontal flange of the angle steel 95 and from that of the outwards directed flange of each T-steel 96, two guide strips 99 connected to the plate 94 and two chain wheels, not shown, one at each end of the beam 93. The moving measuring bar consists of an endless Galls chain 99, each second lower link 100 of which is U-shaped and engages the guide strips 99, pins 101 of said chain 99 protruding beyond the upper link until between the guide strips 98, a great number of angle steels 102 having recesses in their upper flanges, said pins 101 extending through said recesses, an equal number of layers 103 of foam rubber forming a coating of the angle steels 102 and of a number of springs 104 keeping the angle steels pressed against the lower sides of the guide strips 98. The T-steels 96 with the guide strips 98 forming the guide members of the measuring bar are positioned above the periphery of the conveying member with a stepwise increasing height above the conveying member, starting from the supply place. The ends of the guide strips 98 remote from the supply place may be beveled a little in order to gradually adjust the height of the angle steels 102 on their way along the ends of the guide strips 98. Each T-steel 96 extends over the width of a delivery place, so that each fruit being just small enough to slip at a given delivery place through the lower edge of the layer 99 of foam rubber and the upper surface of the conveying member is given the opportunity to do so during a longer period. This increases the sorting exactness. Two T-steels 96 can be adjusted at the same height in order to obtain an extra long delivery place for fruits of a given size. This equal adjustment can readily be effected, as a stop 105 is provided at the upper side of the ends of the T-steels 96 facing the supply place.

It is possible to apply a non-continuous conveying member instead of using a non-continuous measuring bar. The conveying member of the sorting device of FIGURES 15, 16 and 17 is mainly composed of a driven horizontal disc 106, a support 108 and a number of sector members 110, on which disc 106 a number of pins 107 are vertically disposed said support 108 being slidable along the pins 107. The height of the support 108 is adjustable by means of a screw jack 109. These sector members 110 extend along the generating lines of a cone, engage each a pen 112 of the support 108 by means of an oblong eye 111 and rest at their outer ends by means of a hook 113 on stationary nylon guide strips 114. Springs 115 provided between the hooks 113 and the disc 106 push the sector members 110 against the guide strips 114 which are adjustable in height with respect to the frame 117 by means of screw jacks 116 at each of their ends. Preferably the guide strips 114 are adjusted so that their vertical distances to the measuring band 118 are equal over their whole length (see FIG. 17).

With the aid of the screw jack 109 the apex angle of the cone is adjustable. This apex angle is chosen great, that is to say somewhat smaller than 180°, during sorting rolling fruits, whereas the support 108 is adjusted onto a higher position so that the apex angle is considerably smaller for sorting pears and oblong or other non-rolling fruits. The measuring band 118 may be constructed in the same way as the measuring bar of FIGURES 7 and 8 and possibly even in the same way as the measuring band of FIGURES 13 and 14.

What I claim is:

1. Device for sorting in size agricultural or horticultural fruits, comprising a frame, a driven conveying member mounted for rotation in said frame about an axis directed downwards and further comprising a measuring bar supported by said frame, wherein said measuring bar extends above at least part of the periphery of the conveying member and is adapted to be adjusted with respect to said periphery so that it is spaced from the conveying member at an height increasing in the direction of rotation of the conveying member from a supply place for supplying fruits to the conveying member along and beyond a plurality of delivery places for delivering fruits from the conveying member, said conveying member and said measuring bar forming together an uninterrupted chute for the fruits, characterised in that the measuring bar is driven and is supported by the frame through guide members.

2. Device as claimed in claim 1 characterised in that the measuring bar driven at an adjusted height above the conveying member is composed of a plurality of measuring members guided at an adjusted height by the guide members, said measuring members forming a substantially uninterrupted endless elongated member.

3. Device as claimed in claim 2 characterised in that the driven measuring bar comprises a plurality of measuring members guided by guide members above the periphery of the conveying member along a stepped path.

4. Device as claimed in claim 1 characterised in that the conveying member is movable with a certain peripheral speed and that the measuring bar is movable with a lower speed in the same direction.

5. Device as claimed in claim 4 characterised in that the conveying member is movable with a peripheral speed at about five to eight times the moving speed of the measuring bar.

6. Device as claimed in claim 4 characterised in that the conveying member is alternatively movable with a peripheral speed higher than that of the measuring bar or with a peripheral speed equalling the speed of the measuring bar.

7. Device as claimed in claim 6 characterised in that the conveying member is formed by a cone with an adjustable apex angle.

8. Device as claimed in claim 1 wherein the conveying member is driven at a peripheral speed of about 5 to 8 times the speed of the measuring bar.

9. Method of sorting in size agricultural or horticultural rolling fruits, e.g. tomatoes and apples, including the steps of supplying the fruits at the supply place and of conveying each of the fruits by means of a conveying member from the supply place to the place where the adjusted height of a measuring bar above the conveying member is at least equal to the height of the fruit, driving the conveying member at a predetermined peripheral speed and driving the measuring bar at a lower speed in the same direction.

10. Method as claimed in claim 9 wherein the conveying member is driven at a peripheral speed of about five to eight times the speed of the measuring bar.

References Cited

UNITED STATES PATENTS

| | | | |
|---|---|---|---|
| 529,032 | 11/1894 | Jones | 209—105 |
| 3,307,695 | 3/1967 | Wurst | 209—105 |
| 2,829,769 | 4/1958 | Rockafellow | 209—105 |

ALLEN N. KNOWLES, *Primary Examiner.*